(12) United States Patent
Okamoto et al.

(10) Patent No.: US 12,308,560 B2
(45) Date of Patent: May 20, 2025

(54) HERMETIC TERMINAL AND TANK VALVE DEVICE INCLUDING SAME

(71) Applicant: KAWASAKI JUKOGYO KABUSHIKI KAISHA, Kobe (JP)

(72) Inventors: Masayoshi Okamoto, Kobe (JP); Michihiko Tokuda, Kobe (JP); Makoto Ninomiya, Kobe (JP); Yoshiteru Fujimoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 395 days.

(21) Appl. No.: 17/758,507

(22) PCT Filed: Dec. 18, 2020

(86) PCT No.: PCT/JP2020/047487
§ 371 (c)(1),
(2) Date: Jul. 7, 2022

(87) PCT Pub. No.: WO2021/140878
PCT Pub. Date: Jul. 15, 2021

(65) Prior Publication Data
US 2023/0049795 A1 Feb. 16, 2023

(30) Foreign Application Priority Data
Jan. 10, 2020 (JP) .................. 2020-002520

(51) Int. Cl.
*H01R 13/52* (2006.01)
*F16J 13/12* (2006.01)
(Continued)

(52) U.S. Cl.
CPC .......... *H01R 13/5202* (2013.01); *F16J 13/12* (2013.01); *F16K 31/06* (2013.01); *H01R 9/16* (2013.01); *H01R 13/521* (2013.01)

(58) Field of Classification Search
CPC ........ H01R 13/5202; H01R 9/16; F16J 13/12; F16J 31/06
(Continued)

(56) References Cited

U.S. PATENT DOCUMENTS 7,806,712 B2 * 10/2010 Negishi .................. F04B 35/04
439/281

FOREIGN PATENT DOCUMENTS

JP   S58159176 U1   10/1983
JP   S6357339 B2 *  4/1988 ............. F02D 33/00
(Continued)

OTHER PUBLICATIONS

ISA Japan Patent Office, International Search Report Issued in Application No. PCT/JP2020/047487, Feb. 22, 2021, WIPO, 7 pages.
(Continued)

*Primary Examiner* — Peter G Leigh
(74) *Attorney, Agent, or Firm* — Alleman Hall & Tuttle LLP

(57) ABSTRACT

A hermetic terminal including a base made of a synthetic resin having a large-diameter part, designed to be attached to a hole part that connects to each of a low-pressure region and a high-pressure region, at least one electrode inserted through the base, and a seal member designed to be externally mounted on the base in a location closer to the high-pressure region than the large-diameter part, the large-diameter part having a parting line on an outer circumferential face thereof.

8 Claims, 9 Drawing Sheets

(51) Int. Cl.
*F16K 31/06* (2006.01)
*H01R 9/16* (2006.01)

(58) Field of Classification Search
USPC .......................................................... 439/271
See application file for complete search history.

(56) References Cited

FOREIGN PATENT DOCUMENTS

| | | | | |
|---|---|---|---|---|
| JP | S63057339 U1 | | 4/1988 | |
| JP | H05263762 A | * | 10/1993 | ......... H01R 13/5202 |
| JP | 2005294146 A | | 10/2005 | |
| JP | 2005294147 A | | 10/2005 | |
| JP | 2015152165 A | * | 8/2015 | ........... F02M 21/023 |
| WO | 2015005090 A1 | | 1/2015 | |

OTHER PUBLICATIONS

ISA Japan Patent Office, International Search Report Issued in Application No. PCT/JP2020/047487, Feb. 22, 2021, WIPO, 8 pages.

* cited by examiner

HERMETIC TERMINAL AND TANK VALVE DEVICE INCLUDING SAME

TECHNICAL FIELD

The present invention relates to a hermetic terminal designed to be attached to a hole part that connects to each of a low-pressure region and a high-pressure region, and a tank valve device including the same.

BACKGROUND ART

In a pressure container such as a high-pressure hydrogen tank, a tank valve device is provided in an opening part of the pressure container, and discharge of the high pressure gas inside the pressure container is controlled by an electromagnetic valve of the tank valve device. For the electromagnetic valve, a hermetic terminal as indicated, for example, in PTL 1 is used, and a device (specifically, control device) outside the pressure container and a coil or the like of the electromagnetic valve in the pressure container are electrically connected by the hermetic terminal.

CITATION LIST

Patent Literature

PTL 1: Japanese Laid-Open Patent Application Publication No. 2015-152165

SUMMARY OF INVENTION

Technical Problem

The hermetic terminal of PTL 1 is, for example, a glass hermetic terminal. The glass hermetic terminal has a cylindrical metal outer ring made of metal, and an electrode pin to be inserted through the metal outer ring. The glass hermetic terminal is provided with an insulating glass layer between the electrode pin and the metal outer ring so as to ensure the insulation between the electrode pin and the metal outer ring. Due to provision of the insulating glass layer, the inner hole of the metal outer ring cannot be made small in the glass hermetic terminal. Therefore, it is difficult to miniaturize the hermetic terminal.

In light of the above, it is an object of the present invention to provide a hermetic terminal capable of achieving miniaturization.

Solution to Problem

A hermetic terminal of the present invention includes a base made of a synthetic resin having a large-diameter part, designed to be attached to a hole part that connects to each of a low-pressure region and a high-pressure region, at least one electrode inserted through the base, and a seal member designed to be externally mounted on the base in a location closer to the high-pressure region than the large-diameter part, and the large-diameter part has a parting line on an outer circumferential face thereof.

According to the present invention, since the metal outer ring and the glass insulating layer as in the conventional glass hermetic terminal are no longer required, it is possible to miniaturize the hermetic terminal. Further, since the large-diameter part is provided with the parting line, formation of a gap between the seal member and the base can be prevented by the parting line. Therefore, deterioration in the hermeticity of the high-pressure region can be prevented. That is, it is possible to ensure the hermeticity of the high-pressure region while achieving miniaturization for the hermetic terminal.

A hermetic terminal of the present invention includes a base made of a synthetic resin, designed to be fitted into a hole part that connects to each of a low-pressure region and a high-pressure region, and at least one electrode inserted through the base, and the base has a base part, and a seat face formed on the low-pressure region side of the base part, the seat face is pushed against a seating face formed in the hole part to keep hermeticity of the high-pressure region with respect to the low-pressure region, and the base part has a parting line.

According to the present invention, since the metal outer ring is not required, it is possible to miniaturize the hermetic terminal. Also, it is possible to reduce the production cost by reduction in the number of constituting parts, and further it is possible to reduce the weight of the hermetic terminal 1. Also, a gap is formed between the seat face and the seating face by the parting line, and deterioration in the hermeticity of the high-pressure region is prevented. That is, regarding the hermetic terminal, it is possible to ensure the hermeticity of the high-pressure region while achieving miniaturization.

A tank valve device of the present invention is provided for a pressure container, and includes the aforementioned hermetic terminal, a casing designed to be attached to the pressure container, and an electrical component designed to be attached to the casing such that the electrical component is located inside the pressure container which is on the high-pressure region side.

According to the present invention, it is possible to arrange an electrical component such as an electromagnetic valve inside the pressure container while ensuring the hermeticity of the high-pressure region.

Advantageous Effects of Invention

According to the present invention, it is possible to realize miniaturization.

The above objects, other objects, features, and merits of the present invention will be apparent from the following detailed description of preferred embodiments with reference to attached drawings.

DESCRIPTION OF EMBODIMENTS

Hereinafter, hermetic terminals 1, 1A to 1E of Embodiments 1 to 6 according to the present invention, and a tank valve device 2 having the hermetic terminal are described by referring to the aforementioned drawings. The concept of the direction used in the following description is merely used for convenience in description, and should not be understood to limit the orientation or the like of the configuration of the invention to the described direction. The hermetic terminals 1, 1A to 1E and the tank valve device 2 described blow each are merely one embodiment of the present invention. Therefore, the present invention is not limited to the embodiments, and addition, deletion, and modification can be made without departing from the scope of the invention.

Embodiment 1

Figure 1:
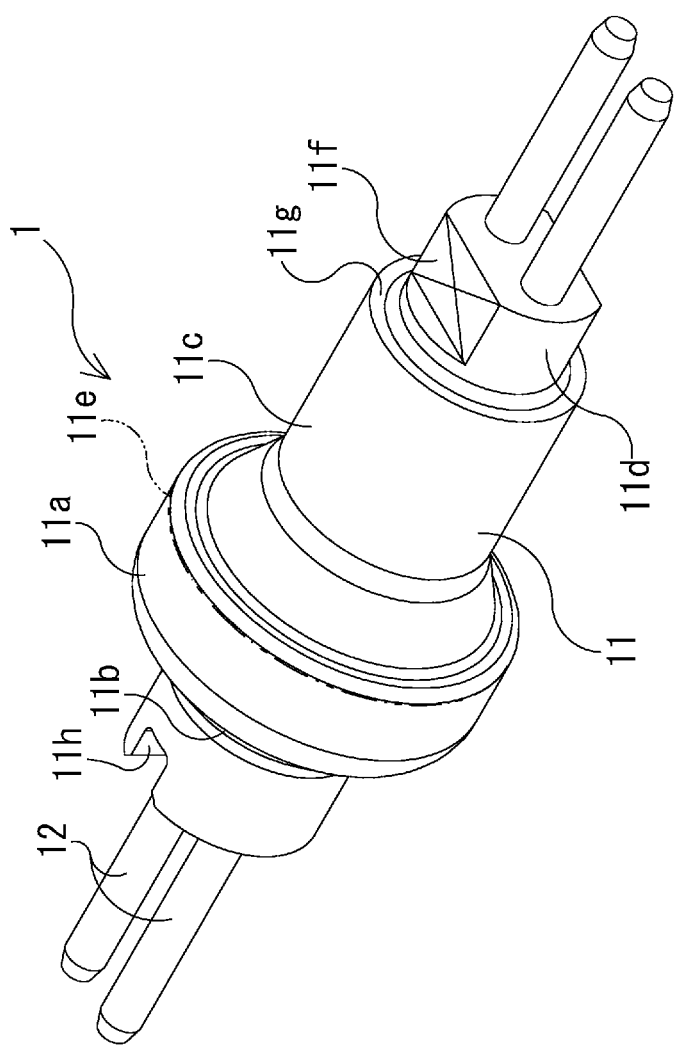
FIG. 1 is a perspective view showing a hermetic terminal of Embodiment 1.

The hermetic terminal 1 shown in FIG. 1 is intended to electrically connect devices respectively disposed in a low-pressure region and a high-pressure region while keeping the hermeticity of the high pressure region with respect to the external low-pressure region in such an arrangement that the interior is the high-pressure region, for example, a device such as a tank valve device or an appliance such as a clean room. The hermetic terminal 1 having such a function has a base 11, at least one electrode (a pair of electrodes in the present embodiment) 12, a seal member 13, and a backup ring 14 as shown in FIG. 1.

The base 11 is made of a synthetic resin such as PEEK, PPS, PI, and PAI. The base 11 has an approximately cylindrical shape. The base 11 need not necessarily be made of only a synthetic resin. The base 11 may be partially made of other substance than a synthetic resin as long as the insulating property is ensured. In the base 11, the electrode 12 is fitted by insertion, and both end parts of the electrode project from the base 11. Also, the base 11 has a large-diameter part 11a in the middle part of the axial direction, and the large-diameter part 11a radially projects to have the largest diameter in the base 11. Also, the base 11 has a contact face 11b on a distal end side of the large-diameter part 11a. The contact face 11b is tapered toward the distal end side from the large-diameter part 11a. On the base 11, the seal member 13 is externally mounted on a mounting face 11c located closer to the one end than the large-diameter part 11a. The seal member 13 is an annular member made of synthetic rubber or the like, for example, an O ring. On the remainder of the base 11, the backup ring 14 is externally mounted. The backup ring 14 is located between the seal member 13 and the large-diameter part 11a to support the seal member 13.

Figure 2:
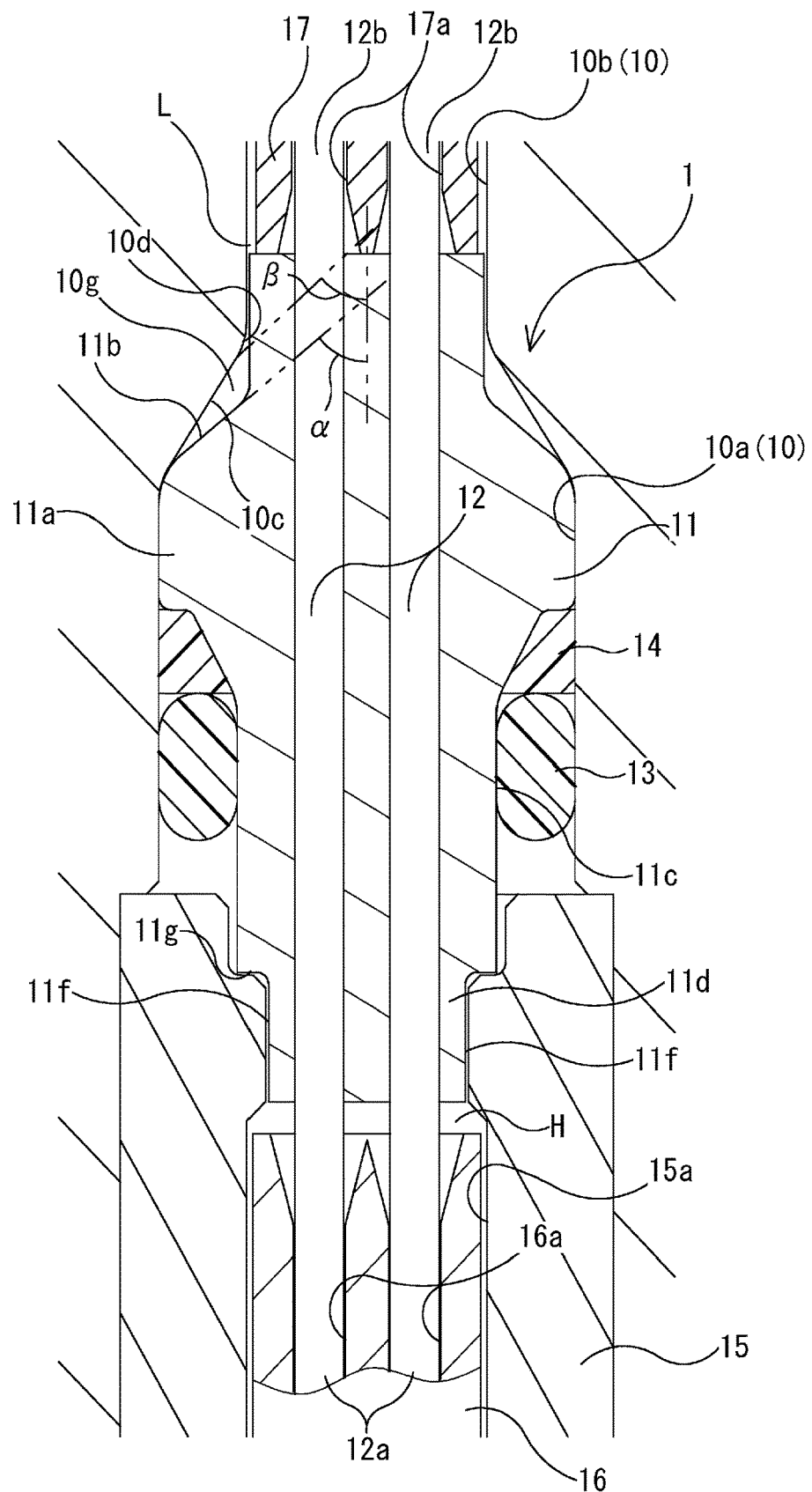
FIG. 2 is a sectional view showing the state in which the hermetic terminal of FIG. 1 is attached.

The hermetic terminal 1 configured as described above is provided to be fitted into a hole part 10 as shown in FIG. 2, for example, the hole part 10 formed in a casing 21 of the tank valve device 2 (see FIG. 8) or in a wall of a clean room as will be described later. The hole part 10 has a large-diameter part 10a and a small-diameter part 10b, and the large-diameter part 10a has a larger diameter than the small-diameter part 10b. Between the large-diameter part 10a and the small-diameter part 10b, the diameter decreases from the large-diameter part 10a side toward the small-diameter part 10b side, and this part forms a tapered seating face 10c. In the hole part 10 having such a shape, the large-diameter part 10a connects to a high-pressure region H (for example, inside the tank or inside the clean room), and the small-diameter part 10b connects to a low-pressure region L (for example, atmospheric air). Therefore, the large-diameter part 10a is at a higher pressure than the small-diameter part 10b, and the hermetic terminal 1 is attached to the hole part 10 to prevent the high pressure gas in the large-diameter part 10a from leaking into the small-diameter part 10b. That is, the hermetic terminal 1 keeps the hermeticity of the high-pressure region H with respect to the low-pressure region L.

To be more specific, in the hermetic terminal 1, the base 11 is inserted in the large-diameter part 10a, and the seal member 13 to be externally mounted on the base 11 is brought into abutment with the inner wall of the hole part 10. In this manner, the seal member 13 ensures the hermeticity of the high-pressure region H with respect to the low-pressure region L. Also, in the hermetic terminal 1, the seal member 13 is arranged on the high-pressure region H side. Specifically, the seal member 13 is arranged in a location closer to the high-pressure region H than the large-diameter part 11a. Therefore, the seal member 13 is designed to be crushed by the gas of the high-pressure region H. Accordingly, it is possible to bring the seal member 13 into intimate contact with the inner wall of the hole part 10, and it is possible to improve the hermeticity. The backup ring 14 is arranged in a location closer to the low-pressure region L than the seal member 13. Accordingly, the backup ring 14 supports the seal member stably.

Also, regarding the hermetic terminal 1, the contact face 11b is brought into abutment with the seating face 10c, and the contact face 11b is pushed against the seating face 10c by the gas of the high-pressure region H. Accordingly, the contact face 11b is formed as follows. That is, a taper angle α of the contact face 11b is larger than a taper angle β of the seating face 10c of the hole part 10. Also, the contact face 11b is R-chamfered in a part connecting with the large-diameter part 11a. Therefore, the contact face 11b is in abutment with the seating face 10c in the R-chamfered R portion. As a result, a gap 10g is formed between the part connecting with the small-diameter part 10b, namely, the part having the most reduced diameter (hereinafter, referred to as "a most reduced diameter part") 10d in the seating face 10c, and the contact face 11b, and they can be separated from each other. Although the most reduced diameter part 10d is corner cut, stress concentration is likely to occur in the part when the contact face 11b comes into contact. Therefore, by separating the contact face 11b from the most reduced diameter part 10d, it is possible to control the occurrence of stress concentration as described above. Also, the hermetic terminal 1 is fixed inside the hole part 10 in the following manner.

That is, one end part 11d of the hermetic terminal 1 projects from the large-diameter part 10a of the hole part 10, and the one end part 11d is inserted through a restriction member 15. In a part of the hermetic terminal 1, a noncircular part having a noncircular cross section is formed. Also, the cross section of the one end part 11d of the base 11 has an approximately oval shape in which the circle is notched at circumferentially distant positions (positions 180 degrees away from each other in the present embodiment) to form flat faces 11f, 11f, and the rotary position of the hermetic terminal 1 can be varied by holding the flat faces 11f, 11f. The one end part 11d of the base 11 need not necessarily have an oval sectional shape, and may have a rectangular sectional shape, and may have any shape that can be held and rotated. Also, the one end part 11d of the base 11 is formed with a step part 11g, and movement toward the high pressure side is restricted by abutment of the step part 11g with the restriction member 15.

Also, a high-pressure side connector 16 is inserted in an attachment hole part 15a. The high-pressure side connector 16 is electrically connected with an electrical component (not shown) arranged in the high-pressure region H. The high-pressure side connector 16 is, for example, a female connector, and one end part 12a is fitted with a pair of insertion holes 16a, 16a formed therein. Meanwhile, other end part 12b of the electrode 12 projects in the small-diameter part 10b, and a low-pressure side connector 17 is inserted in the small-diameter part 10b. The low-pressure side connector 17 is electrically connected with an external device (not shown) arranged in the low-pressure region L. Also, the low-pressure side connector 17 is, for example, a female connector, and the other end part 12b is fitted with an insertion hole 17a formed in the low-pressure side connector 17. Therefore, by connecting each of the two connectors 16, 17 with the hermetic terminal 1 by fitting, it is possible to electrically connect the electrical component and the external device.

Since the hermetic terminal 1 configured as described is configured by inserting the electrode 12 through the base 11 made of a synthetic resin, a metal outer ring and a glass insulating layer as in a conventional hermetic terminal are not required, and thus the hermetic terminal 1 can be miniaturized. Also, since the hermetic terminal 1 requires no metal ring and glass insulating layer, it is possible to reduce the number of constituting parts, and thus it is possible to reduce the production cost and reduce the weight of the hermetic terminal 1.

Also, since the base 11 is formed by molding such as injection molding, it is possible to mass produce the hermetic terminal 1 at a low cost even when the base 11 has a complicated shape. The mold for forming the hermetic terminal 1 is structured by combining a plurality of mold components in consideration of demolding of the hermetic terminal 1 from the mold. For this reason, a parting line is formed at a joint of the mold components in molding of the base 11. In the hermetic terminal 1, a parting line 11e is formed in a location (the large-diameter part 11a in the present embodiment) other than the mounting face 11c by adjusting the position of the joint, and no parting line is formed in the mounting face 11c. In the hermetic terminal 1 according to the present embodiment, the parting line 11e with a circular shape extending over the entire circumference is formed on the outer circumferential face of the large-diameter part 11a of the base 11. For example, when the parting line is formed on the mounting face 11c, a gap is formed between the mounting face 11c and the seal member 13, and the high-pressure gas flows out from the gap. This deteriorates the hermeticity of the high-pressure region H. In the hermetic terminal 1, since the parting line 11e is formed in a location other than the mounting face 11c as described above, the gas will not flow out from between the mounting face 11c and the seal member 13, and it is possible to ensure the hermeticity of the high-pressure region H. That is, the hermetic terminal 1 can ensure the hermeticity of the high-pressure region H while achieving miniaturization.

When sealing is made in a location closer to the high-pressure region H than the parting line 11e as described above, the parting line 11e is located closer to the low-pressure region L than a smooth region lacking the parting line 11e (for example, mounting face 11c). Also, the large-diameter part 11a is located closer to the low-pressure region L than the smooth region, and in the base 11, and the part closer to the high-pressure region H than the smooth region in the base 11 has a constant diameter or tapered. This enables demolding. Also, the parting line need not necessarily be formed only on the outer circumferential face of the large-diameter part 11a, and a parting line that is parallel with the axial line may be formed from the large-diameter part 11a toward the one end (namely on the opposite side of the mounting face 11c across the large-diameter part 11a) in the base 11.

Also, the mold for forming the base 11 is formed such that a gate part that connects to a product shape portion (cavity) of the resin hermetic terminal of the mold from the passage of the mold is located closer to the low-pressure side than the mounting face 11c of the base 11. Accordingly, the gate mark, if peeled off, can be guided to the low-pressure side, and it is possible to prevent the peeled gate mark from entering between the mounting face 11c and the seal member 13, and it is possible to ensure the hermeticity of the high-pressure region H.

Further, in the hermetic terminal 1, the electrode 12 and the base 11 are integrally formed. The electrode 12 has been subjected to a surface treatment such as surface roughening or formation of a bonding film between metal and resin. Moreover, the electrode 12 and the base 11 are joined by dissimilar material joining. The surface treatment may be performed at least in a middle part in the axial direction where the base 11 is provided in the electrode 12. Examples of the surface treatment include chemical treatments and physical treatments by laser irradiation. By such a surface treatment, it is possible to join the electrode 12 and the base 11 firmly. Therefore, it is possible to improve the joining property and hermeticity between the electrode 12 and the base 11.

Embodiment 2

The hermetic terminal 1A of Embodiment 2 resembles the hermetic terminal 1 of Embodiment 1 in configuration. Therefore, the configuration of the hermetic terminal 1A of Embodiment 2 is mainly described about the point different from that of the hermetic terminal 1 of Embodiment 1, and the same constitution is denoted by the same reference numeral, and the description thereof is omitted. This also applies to the later-described hermetic terminals 1B, 1C of Embodiments 3, 4.

Figure 3:
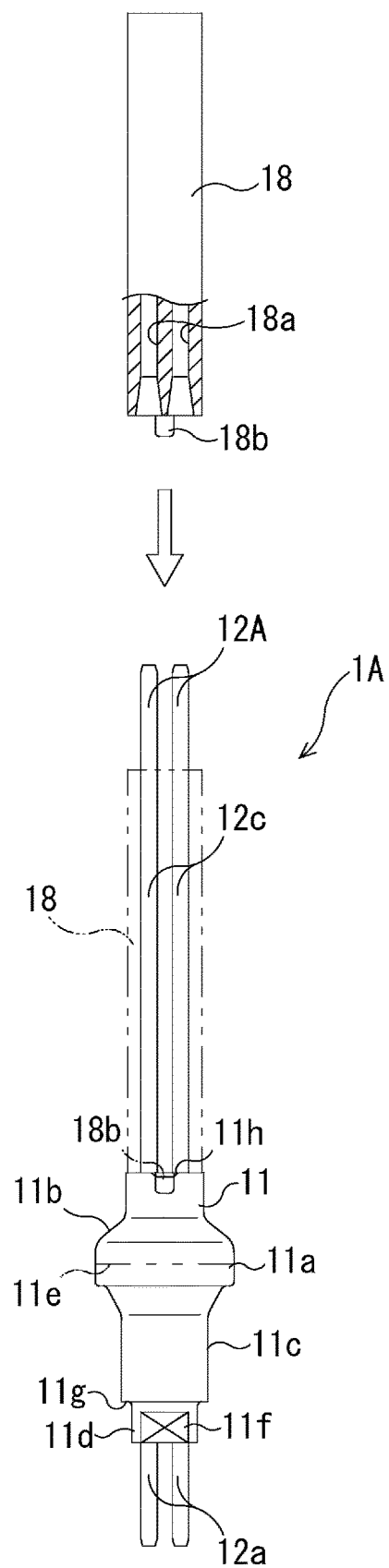
FIG. 3 is a sectional view showing a hermetic terminal of Embodiment 2.

The hermetic terminal 1A of Embodiment 2 has the base 11 and a pair of electrodes 12A, 12A as shown in FIG. 3, the seal member 13 (see FIG. 2), and the backup ring 14 (see FIG. 2). The electrode 12A has an elongated shape. Specifically, in the electrode 12A, other end side part 12c projecting on the low-pressure region L side is longer in shape compared with one end part 12a projecting on the high-pressure region H side. And, the other end side part is covered with an insulator 18.

The insulator 18 is made of an insulating material, for example, a synthetic resin such as PBT, ABS, PP, PA, and PPS. The insulator 18 has an approximately cylindrical shape. The insulator 18 has an insertion hole 18a. In the present embodiment, a pair of insertion holes 18a are formed. The other end side part is covered with the insulator 18 in such a manner that the other end side part of the electrode 12A is fitted with the insertion hole 18a. Also, the insulator 18 is shorter than the other end side part of the electrode 12A, and a distal end part of the other end side part of the electrode 12A projects from the insulator 18. And, the projecting part is fitted in the low-pressure side connector 17 by insertion.

Also, the insulator 18 has at least one projection piece 18b (a pair of projection pieces 18b, 18b in the present embodiment) on one end face that is an end face on the base 11 side. The projection pieces 18b are arranged at intervals in the circumferential direction (intervals of 180 degrees in the present embodiment), and project toward the base 11 from the proximal end face. Also, the other end part of the base 11 has a notch 11h corresponding to the projection piece 18b (see also FIG. 1), and by entry of the pair of projection pieces 18b in the notch 11h, it is possible to prevent the insulator 18 from rotating relatively to the base 11 about the axial line. That is, the other end side part of the pair of electrodes 12A will not be twisted by relative rotation. The notch 11h need not necessarily be formed in the base 11, and may be formed on the insulator 18 side. In such a case, the projection piece 18b is formed on the base side. Any other structure capable of preventing rotation is available.

Further, the insertion hole 18a has an inner diameter that is approximately the same as the outer diameter of the electrode 12A. Accordingly, the electrode 12A can be fitted with the insulator 18. This makes it possible to prevent the insulator 18 from moving relatively to the pair of electrodes 12A in the axial direction. Specifically, the insertion hole 18a is tapered in such a manner that the diameter of the part of the one end side increases toward the other end to facilitate insertion of the electrode 12A. Also the insertion hole 18a is formed such that a part or the whole of the remaining part excluding the opening part of the other end side has an inner diameter that is approximately the same as the outer diameter of the electrode 12A.

In the hermetic terminal 1A configured as described above, it is possible to employ the electrode 12A projecting farther toward the low-pressure region L by using the insulator 18. This makes it possible to extend the distal end of the electrode 12A to a farther position, and shorten or eliminate the conductor to be connected to the electrode 12A. Also, in the hermetic terminal 1A, by configuring the base 11 and the insulator 18 as separate members, it is possible to easily form the insulator 18 as compared with the case where they are formed integrally. Therefore, it is possible to improve the yield of the hermetic terminal 1A.

Besides the above, the hermetic terminal 1A of Embodiment 2 exerts the same operation and effect as the hermetic terminal 1 of Embodiment 1.

Embodiment 3

Figure 4:
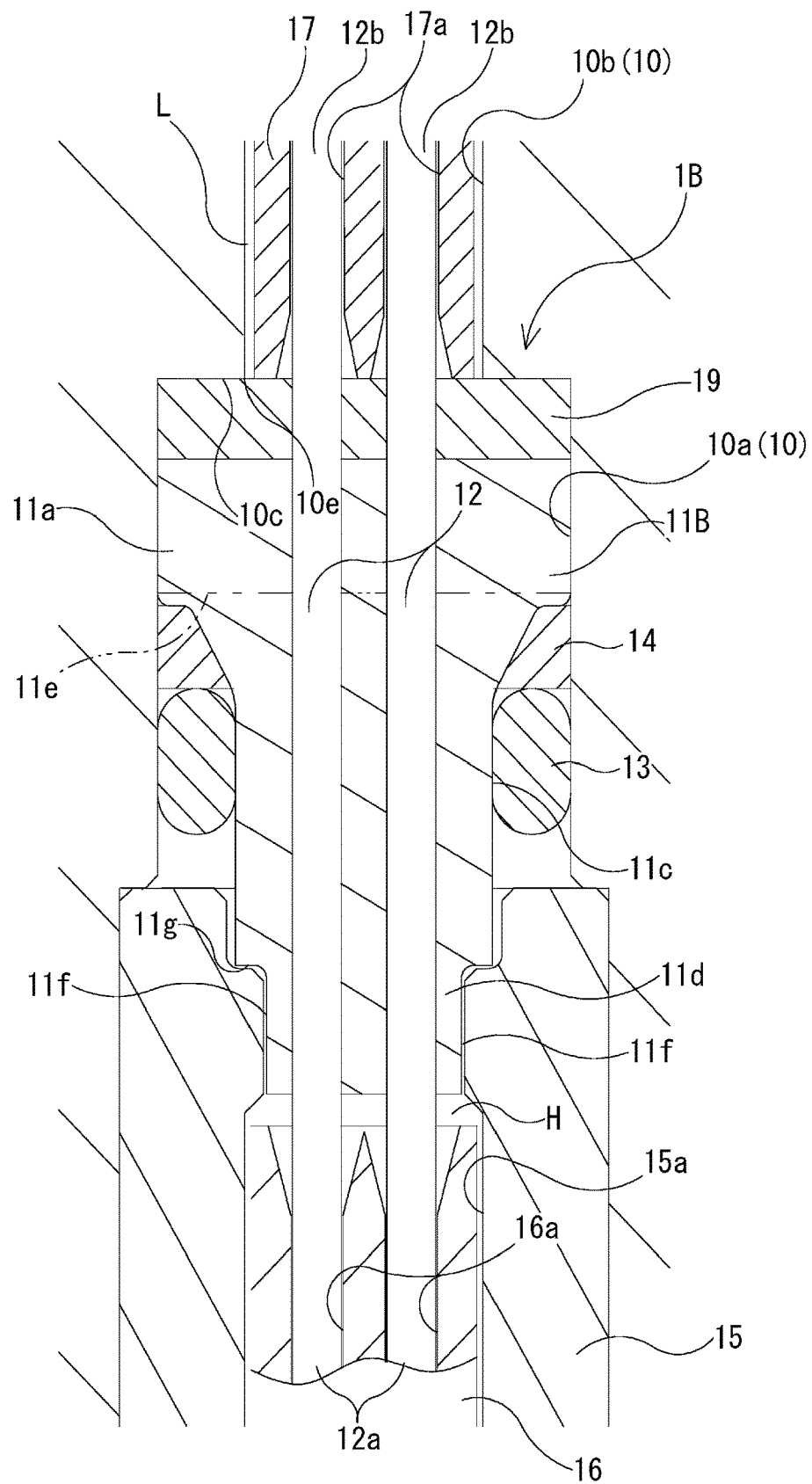
FIG. 4 is an enlarged sectional view of a hermetic terminal of Embodiment 3.

The hermetic terminal 1B of Embodiment 3 has a base 11B, the pair of electrodes 12, the seal member 13, the backup ring 14, and a reinforcing member 19 as shown in FIG. 4. The base 11B has an approximately cylindrical shape, and the distal end part existing on the low-pressure region side is flat. To the distal end part of the base 11B, the reinforcing member 19 is joined by dissimilar material joining. That is, the reinforcing member 19 contains a material having insulating property and higher strength than the synthetic resin that is the material for the base 11B, for example, a ceramic material, and reinforces the distal end part of the base 11B. Therefore, the distal end part of the base 11B abuts on the open end part 10e via the reinforcing member 19, and it is possible to prevent excessive loading on the distal end part of the base 11B when the base 11B is pushed by the gas of the high-pressure region H and pushed toward the seating face 10c. Accordingly, it becomes possible to form a stepped boundary between the large-diameter part 10a and the small-diameter part 10b and make the seating face 10c flat, and thus it is possible to facilitate formation of the hole part 10.

Besides the above, the hermetic terminal 1B of Embodiment 3 exerts the same operation and effect as the hermetic terminal 1 of Embodiment 1.

Embodiment 4

Figure 5:
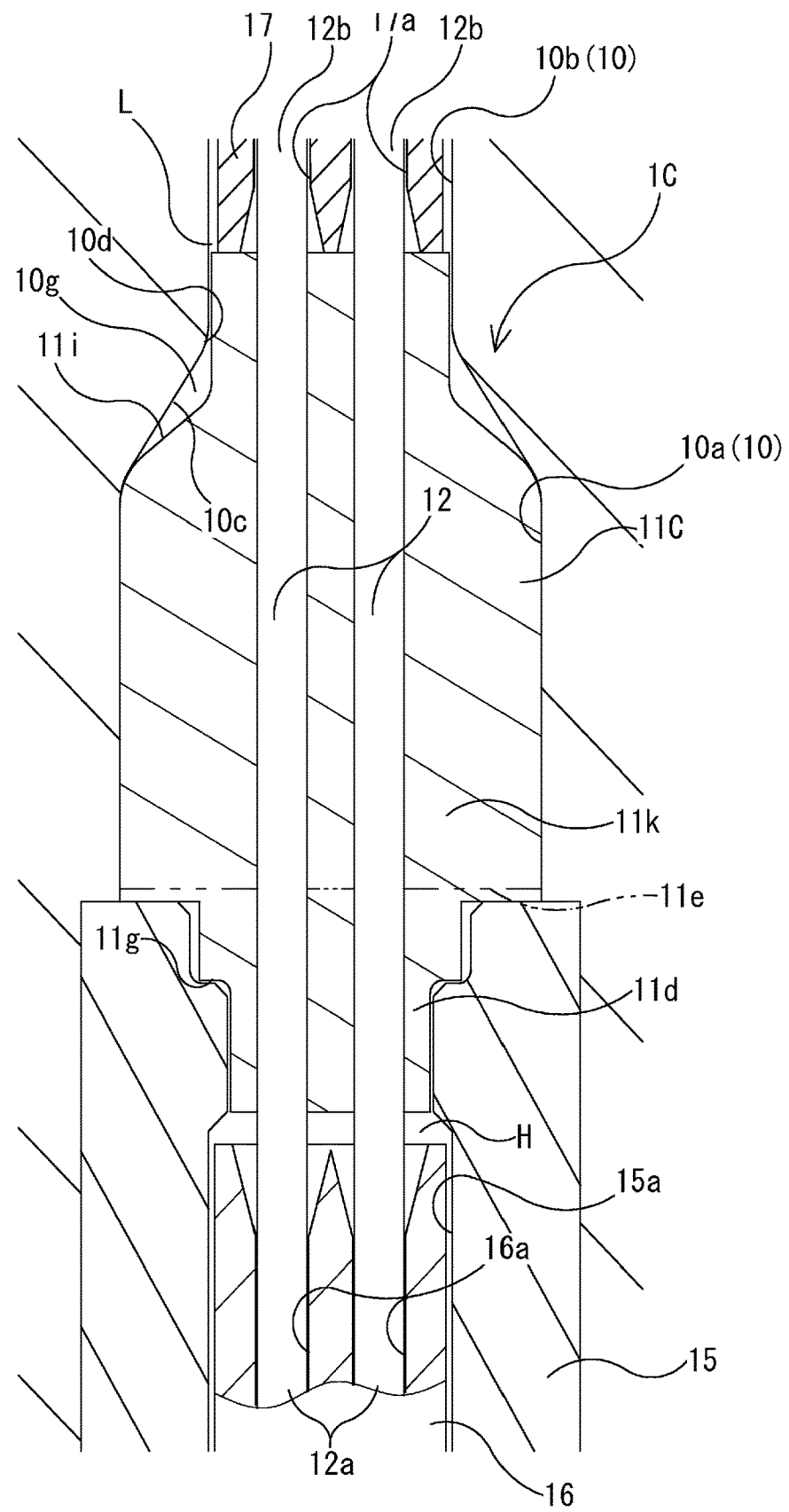
FIG. 5 is an enlarged sectional view of a hermetic terminal of Embodiment 4.

The hermetic terminal 1C of Embodiment 4 has a base 11C, and the pair of electrodes 12, 12 as shown in FIG. 5. The base 11C has a base part 11k having an approximately cylindrical shape, and a seat face 11i, and the seat face 11i is formed in a part on the low-pressure region L side of the base part 11k. The seat face 11i is tapered as with the contact face 11b, and a part on the one end side is seated on the seating face 10c. In this manner, the seat face 11i is seated on the seating face 10c, and thus the high-pressure region H is sealed. The shape of the seat face 11i is not necessarily limited to the aforementioned shape, and may be formed into a partially globular shape.

In the hermetic terminal 1C configured as described above, the base 11C is pushed against the seating face 10c by the gas of the high-pressure region H, and thus leakage of the gas from the high-pressure region H side to the low-pressure region L side is prevented. As a result, the hermiticity of the high-pressure region H with respect to the low-pressure region L can be kept. Also, in the hermetic terminal 1C, since the hermiticity of the high-pressure region H can be kept without using the seal member 13 and the backup ring 14, it is possible to suppress the increase in the number of parts, and reduce the production cost. The hermetic terminal 1C may have the seal member 13 and the backup ring 14, and in such a case, the high-pressure region H can be sealed in two locations.

Also, the hermetic terminal 1C is produced by molding as with the hermetic terminal 1 of Embodiment 1, and the position of forming the parting line 11e is adjusted by adjusting the position of the joint of the mold components. Specifically, in the hermetic terminal 1C, the parting line 11e is formed in a part other than the seat face 11i, and the parting line is not formed in the seat face 11i. In the hermetic terminal 1C according to the present embodiment, the circular parting line 11e extending over the entire circumference on the outer circumferential face of the large-diameter part 11a is formed. Therefore, a gap will not be formed between the seat face 11i and the seating face 10c by the parting line 11e, and the hermiticity of the high-pressure region H is kept.

When sealing is made in a location closer to the low-pressure region L than the parting line 11e as described above, the parting line 11e is located closer to the high-pressure region H than a smooth region lacking the parting line 11e (for example, seat face 11i). Also, the large-diameter part 11a is located closer to the high-pressure region H than the smooth region, and the part closer to the low-pressure region L than the smooth region in the base 11 has a constant diameter or tapered. This enables demolding. Also, the parting line need not be formed only in a circular form in the base part 11k, and a linear part that is parallel with the axial direction may be formed from the circular part toward the other end of the base 11 (namely, on the opposite side of the seat face 11i across the large-diameter part 11a).

Besides the above, the hermetic terminal 1C of Embodiment 4 exerts the same operation and effect as the hermetic terminal 1 of Embodiment 1.

Embodiment 5

The hermetic terminal 1D of Embodiment 5 resembles the hermetic terminal 1C of Embodiment 4 in configuration. Therefore, the configuration of the hermetic terminal 1D of Embodiment 5 is mainly described about the point different from that of the hermetic terminal 1C of Embodiment 4, and the same constitution is denoted by the same reference numeral, and the description thereof is omitted. This also applies to the later-described hermetic terminal 1E of Embodiment 6.

Figure 6:
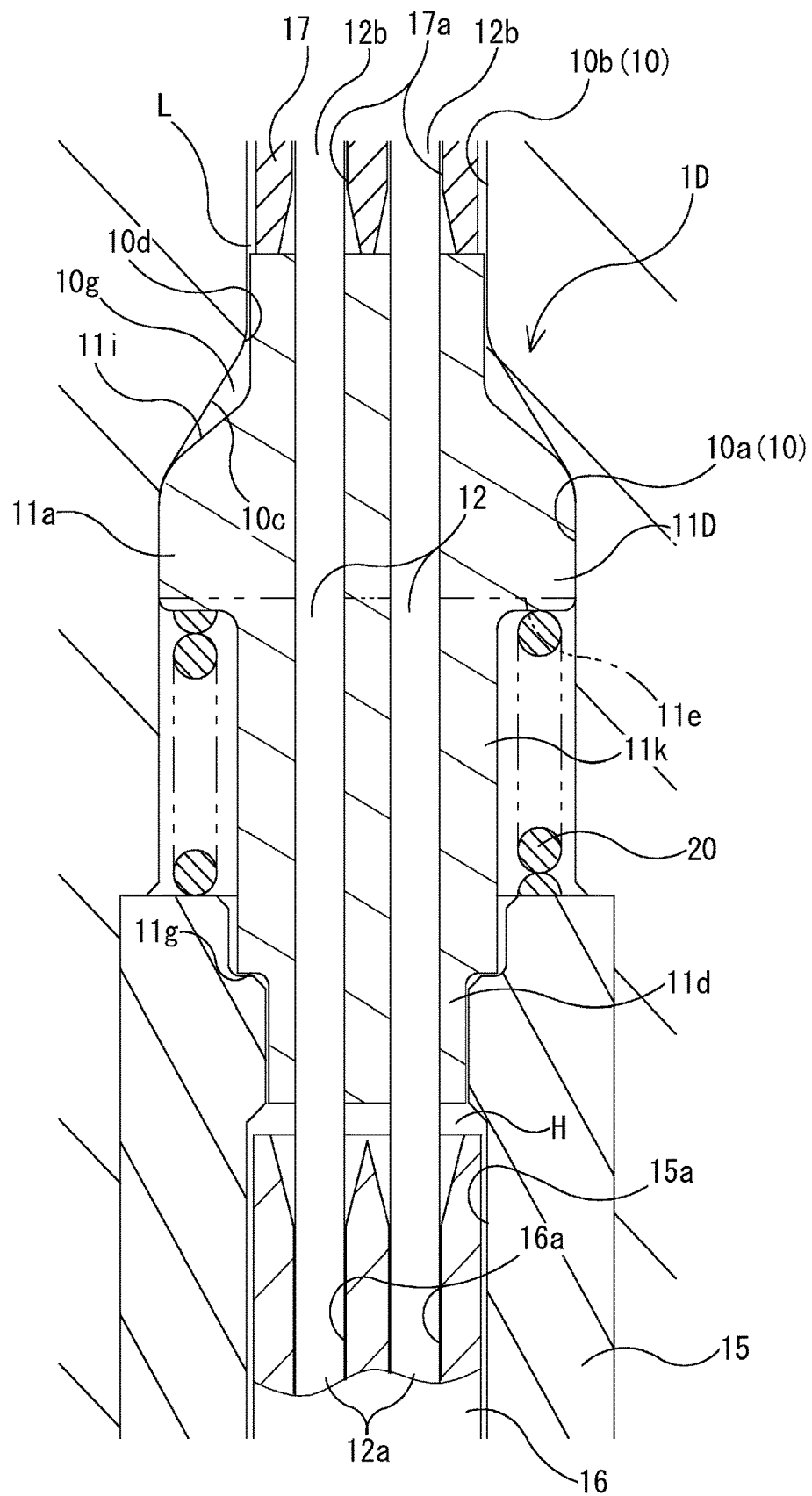
FIG. 6 is an enlarged sectional view of a hermetic terminal of Embodiment 5.

The hermetic terminal 1D of Embodiment 5 has a base 11D, the pair of electrodes 12, 12, and a spring member 20 as shown in FIG. 6. The base 11D has the same shape as the base 11 of Embodiment 1, and the contact face 11b forms the seat face 11i. That is, the seat face 11i is seated on the seating face 10c, and thus the high-pressure region H is sealed. Also, the spring member 20 which is one example of a biasing member biases the base 11D toward the seating face 10c, and is, for example, a compression coil spring. The spring member 20 is accommodated in an annular space formed between the large-diameter part 11a of the base 11D of the hermetic terminal 1D, and the restriction member 15. The spring member 20 arranged as described above is capable of pushing the seat face 11i against the seating face 10c even when the pressure of the high-pressure region H drops and the differential pressure with the low-pressure region L decreases. And thus, the seal of the high-pressure region H can be kept even under undesired loading on the base 11D.

Besides the above, the hermetic terminal 1D of Embodiment 5 exerts the same operation and effect as the hermetic terminal 1C of Embodiment 4.

Embodiment 6

Figure 7:
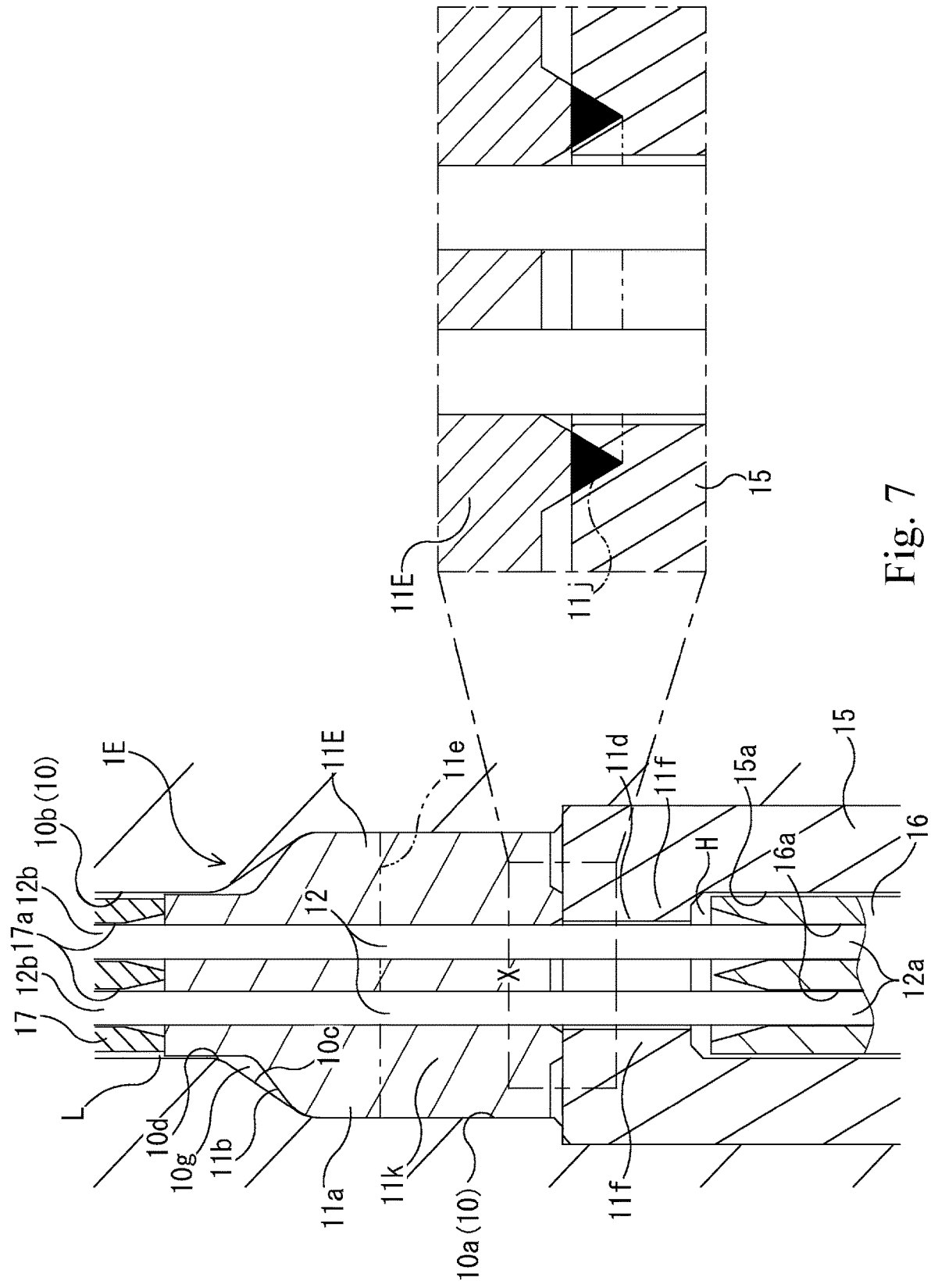
FIG. 7 is an enlarged sectional view of a hermetic terminal of Embodiment 6.

The hermetic terminal 1E of Embodiment 6 has a base 11E, and the pair of electrodes 12, 12 as shown in FIG. 7. The base 11E has a deforming part 11j in the proximal end part as shown in the enlarged view of the region X of FIG. 7. The deforming part 11j projects from the proximal end part of the base 11E, and has an annular shape externally surrounding the periphery of the pair of electrodes 12, 12, for example. The deforming part 11j is formed such that the cross section cut along the cutting plane perpendicular to the circumferential direction in the present embodiment has an approximately triangle shape. The distal end part of the deforming part 11i formed in this manner projects from the large-diameter part 10a, and the restriction member 15 pushes the base 11E against the seating face 10c so as to deform the distal end part (see the blackened part of the deforming part 11j shown in the enlarged view of the region Y in FIG. 9). This makes it possible to push the base 11E against the seating face 10c more strongly, and further improve the sealing performance.

Besides the above, the hermetic terminal 1E of Embodiment 6 exerts the same operation and effect as the hermetic terminal 1C of Embodiment 4.

Example

Figure 8:
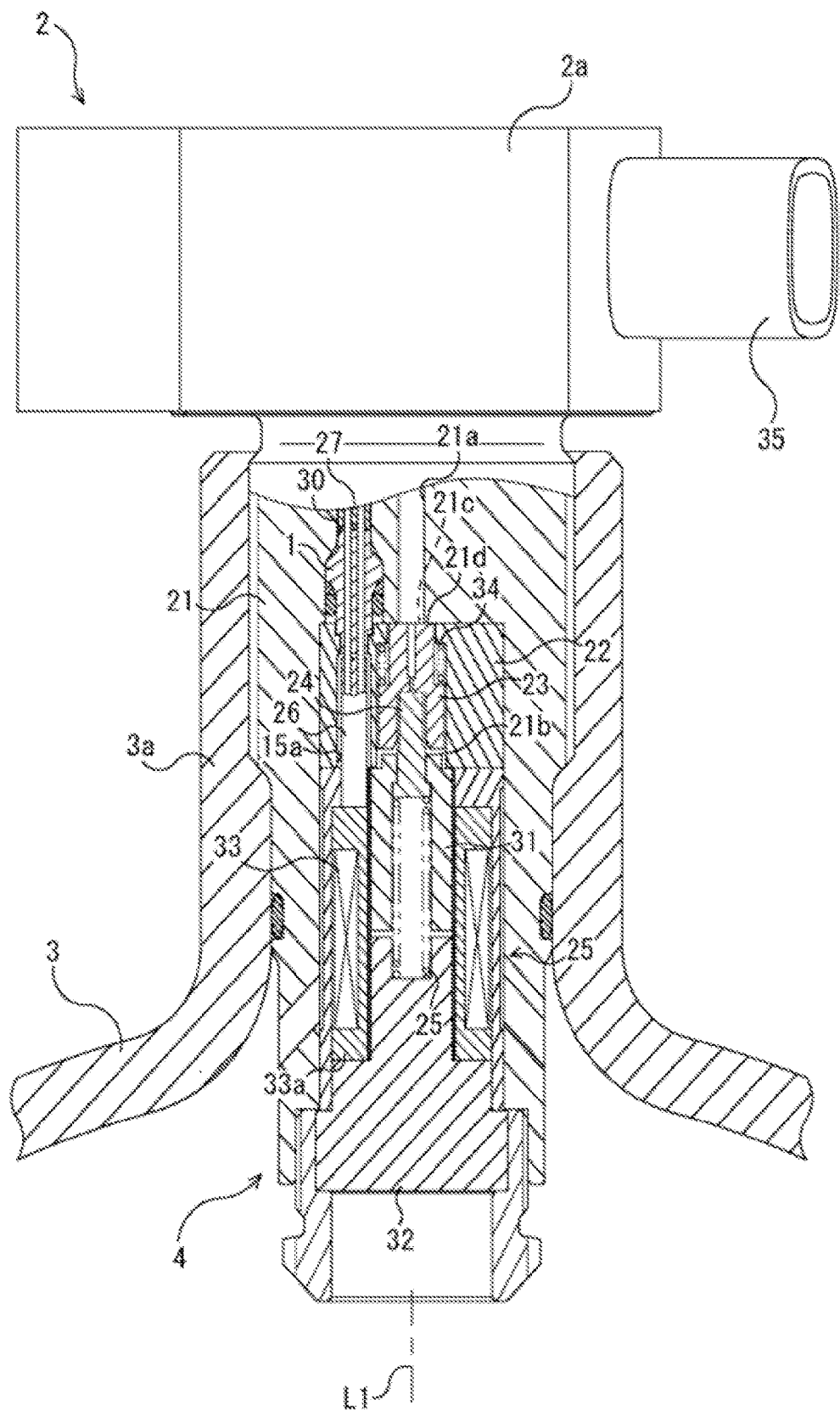
FIG. 8 is a sectional view showing a tank valve device including a hermetic terminal.

Hereinafter, one example of embodiments to which the hermetic terminals 1, 1A to 1E are applied, namely the tank valve device 2 as shown in FIG. 8 is described. Regarding the configuration of the tank valve device 2, the constitution corresponding to the constitution in the aforementioned embodiments is denoted by the same symbol in the corresponding constitution, and detailed description thereof is omitted.

The tank valve device 2 is provided for a pressure container, for example, a high-pressure tank container 3, and controls discharge or the like of the gas such as hydrogen and LNG stored in the container. The tank valve device 2 is configured by a plurality of valves including an electromagnetic valve 4 and a pressure reducing valve (not shown), and has a valve block 2a for attachment of a plurality of valves. The valve block 2a is screwed in such a manner that a part of the valve block 2a is inserted into an opening 3a of the high-pressure tank container 3, and the electromagnetic valve 4 is attached to the inserted part (hereinafter, referred to as "casing" for convenience of description) 21.

[Electromagnetic Valve]

The electromagnetic valve 4 controls discharge of the gas in the high-pressure tank container 3 by opening/closing a valve passage 21a formed in the casing 21. Specifically, the electromagnetic valve 4 includes a guide member 22, a main valve element 23, a seat piston 24, and an electromagnetic driver 25 besides the casing 21, and these are housed in a valve chamber 21b of the casing 21 in such a manner that they are aligned on an axial line L1. The guide member 22 is arranged to surround a valve port 21c, and the main valve element 23 is inserted through the guide member 22. The main valve element 23 closes the valve passage 21a by seating its distal end part on a valve seat 21d. In the main valve element 23, a pilot passage 23a is formed, and that is opened or closed by the seat piston 24. The seat piston 24 can be driven by the electromagnetic driver 25, and the electromagnetic driver 25 is configured as follows. The electromagnetic driver 25 has a plunger 31, a fixed magnetic pole 32 and a solenoid 33. On the distal end side of the plunger 31, the seat piston 24 is inserted and engaged. On the proximal end side of the plunger 31, the fixed magnetic pole 32 is disposed to face, and the solenoid 33 is arranged to surround them.

In the electromagnetic valve 4 configured as described above, the solenoid 33 is electrically connected with an external device outside the high-pressure tank container 3, for example, a controller (not shown), and the electromagnetic valve 4 is driven by a driving signal from the controller. For this reason, the solenoid 33 has a solenoid side connector 26 for electrically connecting the solenoid 33 and the external device. The solenoid side connector 26, which corresponds to the aforementioned high-pressure side connector 16, is capable of connecting the hermetic terminal 1 by fitting each of the electrodes 12 with the insertion hole 16a.

To be more specific, the solenoid side connector 26 is fixed, for example, to a bobbin 33a of the solenoid 33, and projects toward the guide member 22 from there. The guide member 22, which corresponds to the aforementioned the restriction member 15, is formed with an attachment hole part 15a into which the solenoid side connector 26 is to be inserted. And, from the proximal end side of the attachment hole part 15a, the solenoid side connector 26 is inserted. Also, in the casing 21, a through hole part 30 is formed at a position corresponding to the attachment hole part 15a.

The through hole part 30 corresponds to the aforementioned hole part 10, and the hermetic terminal 1 is fitted therein. That is, the one end part 11d of the base 11 projects from the through hole part 30 to the attachment hole part 15a, and the base 11 is held by the guide member 22 and the casing 21 and fixed to the through hole part 30. Also, the one end part 12a of the electrode 12 projecting from the base 11 is fitted with the insertion hole 16a of the solenoid side connector 26. Thus, the solenoid 33 and the hermetic terminal 1 are electrically connected.

In the small-diameter part 10b of the hole part 10, a device side connector 27 corresponding to the low-pressure side connector 17 is inserted. The device side connector 27 is connected with external device via a conductor (not shown) and an external terminal 35, and by inserting the other end part 12b of the electrode 12 through the insertion hole 17a of the device side connector 27, it is possible to electrically connect the external device and the hermetic terminal 1.

Figure 9:
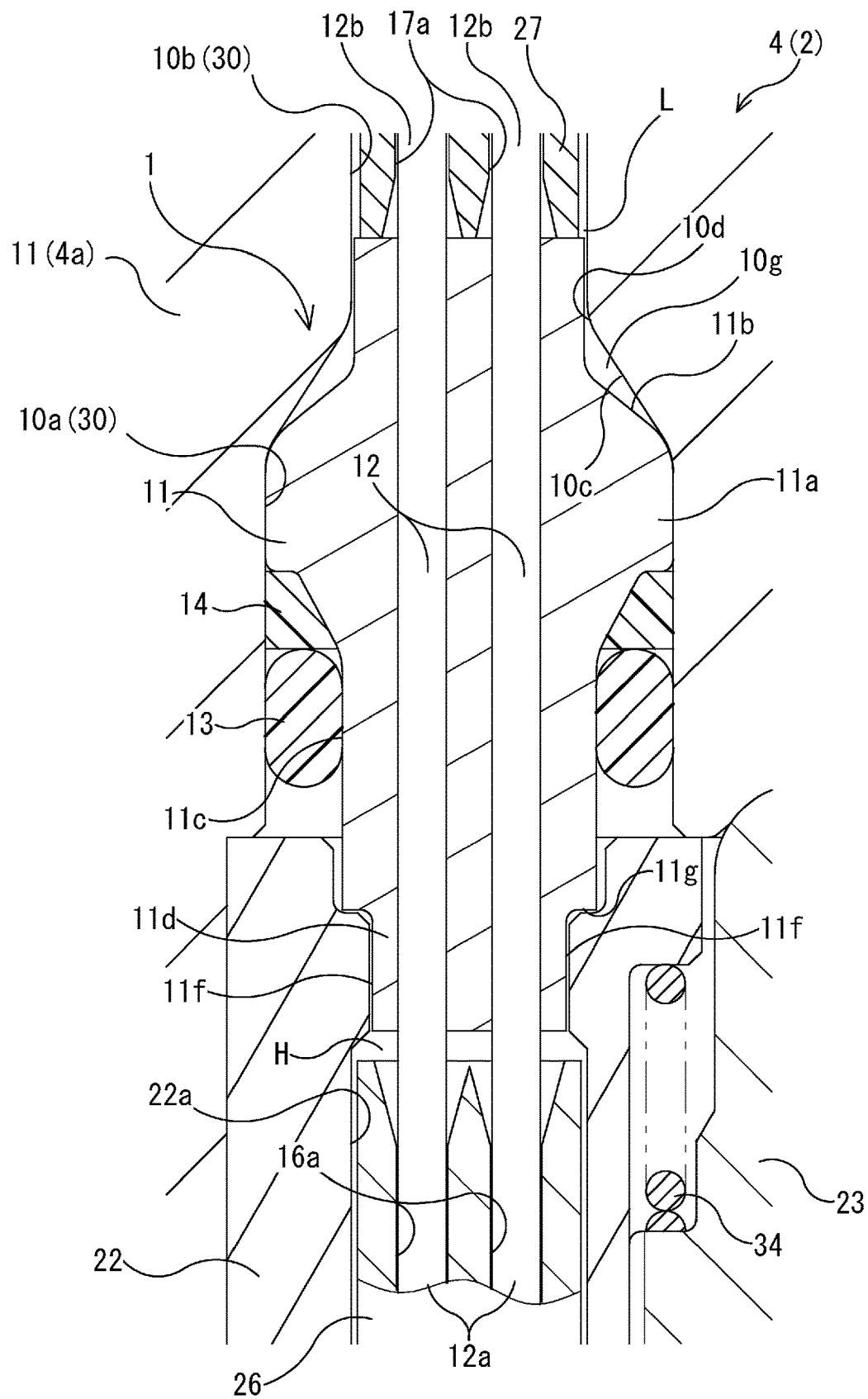
FIG. 9 is an enlarged sectional view of a part of the tank valve device of FIG. 8.

In the tank valve device 2 configured as described above, the large-diameter part 10a of the through hole part 30 is the high-pressure region H as shown in FIG. 9. That is, the large-diameter part 10a connects to the valve chamber 21b via various gaps and the like, and is under the same pressure as the interior of the high-pressure tank container 3. On the other hand, the small-diameter part 10b of the through hole part 30 is the low-pressure region L. In the present embodiment, the small-diameter part 10b connects to the outside of the high-pressure tank container 3. By attaching the above-described hermetic terminal 1 to the through hole part 30 that connects to the low-pressure region L and the high-pressure region H, it is possible to prevent the gas from flowing out from the high-pressure region H to the low-pressure region L, and it is possible to keep the hermeticity of the high-pressure region H with respect to the low-pressure region L. Also, miniaturization and weight reduction can be achieved for the hermetic terminal 1, and thus miniaturization and weight reduction can be achieved also for the tank valve device 2.

Also, in the tank valve device 2, the through hole part 30 is formed to be adjacent to the valve passage 21a in the radial direction, and the hermetic terminal 1 and the connectors 16, 17 can be located on the inner side of the outer edge of the solenoid 33 when they are viewed from the axial direction. Accordingly, it is possible to reduce the outer diameter of the electromagnetic valve 4. Also, since the solenoid side connector 26 and the hermetic terminal 1 are arranged at radially outward positions of the main valve element 23, it is possible to prevent the electromagnetic valve 4 from being long in the axial direction. Further, it is easy to assemble the electromagnetic valve 4 because the electromagnetic valve 4 can be assembled only by inserting the hermetic terminal 1 attached to the casing 21 into the guide member 22.

Other Embodiments

In the hermetic terminal 1A of Embodiment 2, the insulator 18 that covers a part of the other end side part is configured by a member separate from the base 11, however, the part closer to the distal end than the large-diameter part 11a in the base 11 may be elongated so as to cover the part of the other end side part. Also, in the hermetic terminal 1B of Embodiment 3, the distal end face of the base 11B and the seating face 10c are flat, however, they may be tapered. Further, the hermetic terminals 1, 1A to 1E of Embodiments 1 to 6 respectively include two electrodes 12, 12A, however, the number of electrodes is not limited to two, but may be one or may be three or more. In the case of any number of electrodes, since the base 11 is formed only of a synthetic resin, it is possible to produce the hermetic terminals 1, 1A to 1E with a smaller diameter compared with a conventional hermetic terminal having a metal outer ring while keeping the interval between electrodes (namely, ensuring the insulation between electrodes). While the solenoid 33 is exemplified as the electrical component of the tank valve device 2 of the present embodiment, the electrical component is not limited to the solenoid 33, and may be a sensor, an electric motor, and a piezo-electric device and the like as long as the electrical component can transmit a signal or electric power. Also, the deforming part 11j may be formed in the base 11D of the hermetic terminal 1D.

Further, not both of the contact face 11b and the seating face 10c are required to be tapered. That is, either one of these may be formed into a partially globular shape. This makes it possible to separate the contact face 11b from the most reduced diameter part 10d. Also, both of the contact face 11b and the seating face 10c may be formed into a partially globular shape. In this case, for example, by designing the radius of curvature of the contact face 11b to be larger than the radius of curvature of the seating face 10c, it is possible to separate the contact face 11b from the most reduced diameter part 10d.

Various modifications and other embodiments of the present invention will be apparent to those skilled in the art from the above description. Accordingly, the above description should be interpreted merely as illustration, and is provided for the purpose of indicating the best mode for carrying out the present invention to those skilled in the art. The details of the structure and/or the function can be substantially changed without departing from the spirit of the present invention.

REFERENCE CHARACTERS LIST 1, 1A to 1E hermetic terminal
2, 2A to 2E tank valve device
3 high-pressure tank container
10 hole part
10c seating face
10d most reduced diameter part
11, 11B, 11C, 11E base
11a large-diameter part
11b seat face
11e parting line
11h seat face
11j deforming part
11k base part
12, 12A electrode
5 seal member
18 insulator
19 reinforcing member
20 spring member (biasing member)
21 casing
23 main valve element
25 electromagnetic driver
H high-pressure region
L low-pressure region
α taper angle
β taper angle

The invention claimed is:
1. A hermetic terminal comprising:
a base made of a synthetic resin having a mounting face and a large-diameter part, designed to be attached to a hole part that connects to each of a low-pressure region and a high-pressure region;
at least one electrode inserted through the base; and
a seal member designed to be externally mounted on the mounting face of the base in a location closer to the high-pressure region than the large-diameter part,
the large-diameter part having a parting line on an outer circumferential face thereof, and
the parting line not being formed on the mounting face.
2. The hermetic terminal according to claim 1, wherein the base has a contact face on a low-pressure region side of the large-diameter part, and the contact face is seated on a seating face formed in the hole part, and the contact face has a gap with a most reduced diameter part of the seating face.
3. The hermetic terminal according to claim 1, further comprising:
a reinforcing member having a higher strength than the base and insulating property, wherein the reinforcing member is attached to a part on a low-pressure region side of the base, and the base is seated on a seating face of the hole part via the reinforcing member.

4. The hermetic terminal according to claim 1, further comprising:
an insulator made of a synthetic resin having insulating property, wherein
the electrode has at least a projecting part projecting from the base,
the base is integrally formed around the electrode, and
the insulator is fitted with the projecting part of the electrode.

5. A tank valve device, designed to be provided for a pressure container, the tank valve device comprising:
the hermetic terminal according to claim 1;
a casing designed to be attached to the pressure container; and
an electrical component designed to be attached to the casing such that the electrical component is located inside the pressure container which is a high-pressure region side.

6. A hermetic terminal comprising:
a base made of a synthetic resin, designed to be fitted into a hole part that connects to each of a low-pressure region and a high-pressure region; and
at least one electrode inserted through the base,
the base having a base part, and a seat face formed on a low-pressure region side of the base part,
the base part having a parting line,
the seat face having no parting line and being pushed against a seating face formed in the hole part to keep hermeticity of the high-pressure region with respect to the low-pressure region.

7. The hermetic terminal according to claim 6, further comprising a biasing member that biases the base to push the seat face against the seating face.

8. The hermetic terminal according to claim 6, wherein the base has a deforming part on a high-pressure region side, and the base is pushed until the deforming part deforms so as to seat the seat face on the seating face.

* * * * *